US012614957B2

(12) United States Patent (10) Patent No.: US 12,614,957 B2
Deutsch et al. (45) Date of Patent: Apr. 28, 2026

(54) METHOD FOR MOUNTING FORM-WOUND COILS OR TOOTH-WOUND COILS

(71) Applicant: Flender GmbH, Bocholt (DE)

(72) Inventors: Artur Deutsch, Bad Griesbach i. Rottal (DE); Norbert Schönbauer, Bad Füssing (DE); Michael Weger, Kösslarn (DE)

(73) Assignee: Flender GmbH, Bocholt (DE)

( * ) Notice: Subject to any disclaimer, the term of this patent is extended or adjusted under 35 U.S.C. 154(b) by 712 days.

(21) Appl. No.: 17/908,154

(22) PCT Filed: Feb. 5, 2021

(86) PCT No.: PCT/EP2021/052779
§ 371 (c)(1),
(2) Date: Aug. 30, 2022

(87) PCT Pub. No.: WO2021/185510
PCT Pub. Date: Sep. 23, 2021

(65) Prior Publication Data

US 2023/0231451 A1 Jul. 20, 2023

(30) Foreign Application Priority Data

Mar. 19, 2020 (EP) .................................... 20164225

(51) Int. Cl.
*H02K 15/043* (2025.01)
*H02K 1/16* (2006.01)
(Continued)
(52) U.S. Cl.
CPC ......... *H02K 15/0431* (2025.01); *H02K 1/165* (2013.01); *H02K 3/12* (2013.01); *H02K 15/063* (2013.01)

(58) Field of Classification Search
CPC .... H02K 15/063; H02K 15/0431; H02K 1/18; H02K 1/165; H02K 3/505
See application file for complete search history.

(56) References Cited

U.S. PATENT DOCUMENTS

| 4,351,103 A | 9/1982 | Rodenbeck |
| 4,400,871 A | 8/1983 | Barrera |

(Continued)

FOREIGN PATENT DOCUMENTS

| CN | 109586526 A | 4/2019 |
| EP | 3 621 182 | 3/2020 |
| WO | WO 2019/185222 | 10/2019 |

OTHER PUBLICATIONS

International Search Report issued by the European Patent Office in International Application PCT/EP2021/052964 on May 10, 2021.

(Continued)

*Primary Examiner* — Minh N Trinh
(74) *Attorney, Agent, or Firm* — Henry M. Feiereisen LLC

(57) ABSTRACT

In a method for mounting a prefabricated form-wound coil or tooth-wound coil on a layered laminated core to form a stator segment or stator, the form-wound coil or tooth-wound coil is insulated with insulation. Laminates are punched and stacked to form partial laminated cores and/or a laminated core, with the partial laminated cores being spaced apart from one another by spacers and forming substantially axially extending open slots of the laminated core. The form-wound coil or tooth-wound coil are radially inserted into the slots such as to embrace a tooth of the laminated core, and a removable auxiliary element is placed at an axial end face of the laminated core to protect the insulation of the form-wound coil or tooth-wound coil as the form-wound coil or tooth-wound coil is radially inserted into (Continued)

the slots. The auxiliary element is radially removed and repositioned on a further tooth of the laminated core.

4 Claims, 3 Drawing Sheets

(51) Int. Cl.
  *H02K 3/12* (2006.01)
  *H02K 15/062* (2025.01)

(56) References Cited

U.S. PATENT DOCUMENTS

| | | | | |
|---|---|---|---|---|
| 6,028,386 | A * | 2/2000 | Kech | H02K 5/225 |
| | | | | 310/194 |
| 2016/0156242 | A1* | 6/2016 | Eckert | H02K 3/522 |
| | | | | 310/68 R |
| 2017/0229936 | A1 | 8/2017 | Kang et al. | |
| 2018/0166956 | A1 | 6/2018 | Seno | |
| 2018/0198353 | A1 | 7/2018 | Kuroyanagi et al. | |
| 2023/0231451 | A1* | 7/2023 | Deutsch | H02K 1/165 |
| | | | | 310/179 |

OTHER PUBLICATIONS

Chinese Search Report Issued on Jan. 23, 2025, with respect to counterpart Chinese patent application 202180022354.4.
Translation of Chinese Search Report issued on Jan. 23, 2025 with respect to counterpart Chinese patent application 202180022354.4.

* cited by examiner

METHOD FOR MOUNTING FORM-WOUND COILS OR TOOTH-WOUND COILS

CROSS-REFERENCES TO RELATED APPLICATIONS

This application is the U.S. National Stage of International Application No. PCT/EP2021/052779, filed Feb. 5, 2021, which designated the United States and has been published as International Publication No. WO 2021/185510 A1 and which claims the priority of European Patent Application, Serial No. 20164225.3, filed Mar. 19, 2020, pursuant to 35 U.S.C. 119 (a)-(d).

BACKGROUND OF THE INVENTION

The invention relates to a method for mounting form-wound coils or tooth-wound coils in slots of a laminated core of a dynamo-electric machine, and to auxiliary elements for mounting these coils in a laminated core.

Stators or stator segments of dynamo-electric machines have, in a layered laminated core, coils in order to drive a working machine by way of electromagnetic interaction with a rotor or to generate electrical energy by way of the driven rotor.

In particular in dynamo-electric machines with a high performance class (greater than 1 MW), the introduction of these form-wound or tooth-wound coils is problematic, since there needs to be a comparatively high copper filling factor in a slot and, moreover, insulation needs to be provided around the form-wound coils or tooth-wound coils. The introduction of the coils via the slot slit is accordingly complicated. This introduction of the winding system, i.e. of the form-wound coils or tooth-wound coils, into the slots, can result in damage to the insulation of the form-wound coils or tooth-wound coils on account of the contact with the edges of the teeth of the laminated core.

It is known to insert a slot lining as a sliding aid and for protecting the insulation. However, this slot lining can provide only insufficient protection against damage to the insulation of form-wound coils and tooth-wound coils while they are being introduced into the slot.

Against this background, the invention is based on the object of providing a method for introducing form-wound coils or tooth-wound coils into slots of stators or stator segments, which preclude damage to the insulation of form-wound coils or tooth-wound coils by teeth of the laminated core while they are being introduced.

SUMMARY OF THE INVENTION

The stated object is achieved by a method for mounting prefabricated form-wound coils or tooth-wound coils on a layered laminated core to form a stator segment or stator by way of the following steps:

produced a form-wound coil or tooth-wound coils with insulation, punching and stacking laminates to form partial laminated cores and/or laminated cores, which are spaced apart from one another by spacers, with the aid of pressure plates having pressure fingers with open slots that extend substantially axially, radially inserting the form-wound coils or tooth-wound coils into the slots, which comprise one or more teeth of the laminated core, wherein, at least at the tooth end faces of the laminated core, removable auxiliary elements are present, which protect the insulation of the form-wound coils or tooth-wound coils during the radial insertion, radially removing the auxiliary elements and repositioning the auxiliary elements on further teeth.

The stated object is also achieved by an auxiliary element for facilitating the mounting of form-wound or tooth-wound coils in slots of a laminated core, wherein the auxiliary element has in particular a basic structure similar to an isosceles triangle with mutually facing curved legs.

By way of the method according to the invention, an auxiliary element is now provided at least at each of the end-face ends of a laminated core, said auxiliary element, during radial mounting of the form-wound or tooth-wound coils in the slots of the laminated core, ensuring guidance of these coils into the slot in the laminated core. In this way, in particular damage to the insulation by the edges of the teeth is avoided.

The form-wound or tooth-wound coils are open or closed coils which have a solid insulated conductor or individual mutually insulated partial conductors. These mutually insulated partial conductors are generally surrounded by a main insulation. The main insulation is present in particular in the provided slot region of a dynamo-electric machine.

If the laminated core is provided with pressure plates having pressure fingers at the end faces, the auxiliary elements are preferably placed on the pressure fingers, such that, in this way too, contact with the sharp edges of the teeth in the region of the end faces of the laminated core with the insulation of the form-wound and tooth-wound coils is avoided. The width of the pressure fingers is less than the width of the teeth, and so the auxiliary elements can ensure guidance of the coils without reducing the width of the slot during mounting.

Such a laminated core can also, as seen in the axial direction, be constructed from partial laminated cores which are each separated from one another by spacers.

In order now to always avoid contact of the insulation of the form-wound or tooth-wound coils with the sharp-edged teeth of the laminated core or partial laminated core, such auxiliary elements should be arranged not only at the end faces but also, for example, on the spacers between the partial laminated cores. This reduces the contact with the insulation and the sharp-edged teeth.

According to the invention, the auxiliary element is embodied in the form of a triangle, wherein the two legs of a simultaneously formed triangle have a kink. This kink ensures the guidance of the form-wound or tooth-wound coils in the region of the tooth during mounting. The legs of the triangle can in this case also be embodied in a curved manner.

In order to achieve fixing of the auxiliary element, the two legs of this isosceles triangle are extended beyond the hypotenuse of this triangle, such that, via these extended legs, fixing can take place on pressure fingers, on the laminates or on the spacers. This fixing can be improved by snap-fitting elements on the extended legs.

Other shapes of auxiliary elements are also possible, which ensure damage-free mounting of coils in slots of a laminated core.

BRIEF DESCRIPTION OF THE DRAWING

The invention and further advantageous configurations of the invention are explained in more detail by way of schematically illustrated exemplary embodiments; in the figures.

DETAILED DESCRIPTION OF PREFERRED EMBODIMENTS

Figure 1:
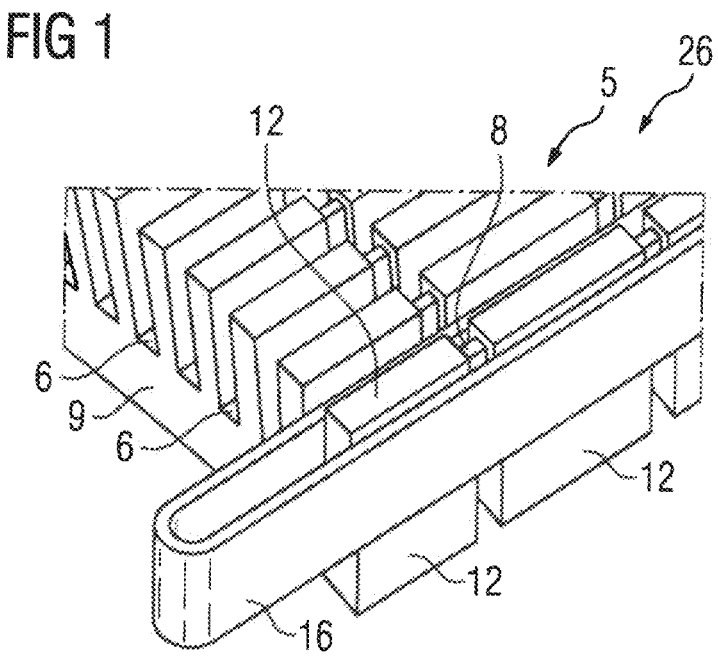
FIG. 1 shows a perspective illustration of a stator segment.

FIG. 1 shows a perspective illustration of a stator segment 5, with a tooth-wound coil 16 in a slot 6. The laminated core 26 is subdivided into partial laminated cores 12, which are spaced apart from one another by means of spacers 8.

Figure 2:
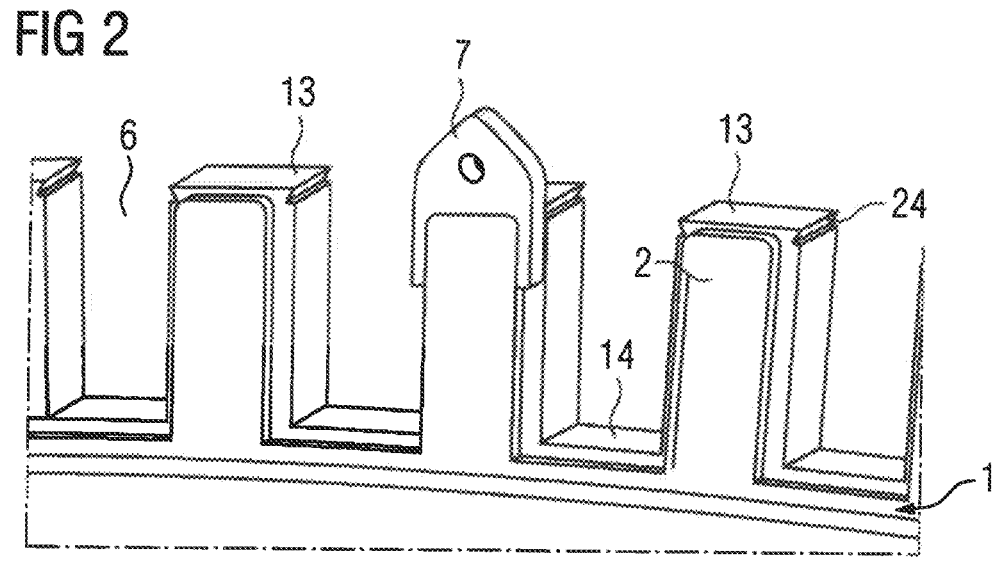
FIG. 2 shows a partial laminated core.
Figure 3:
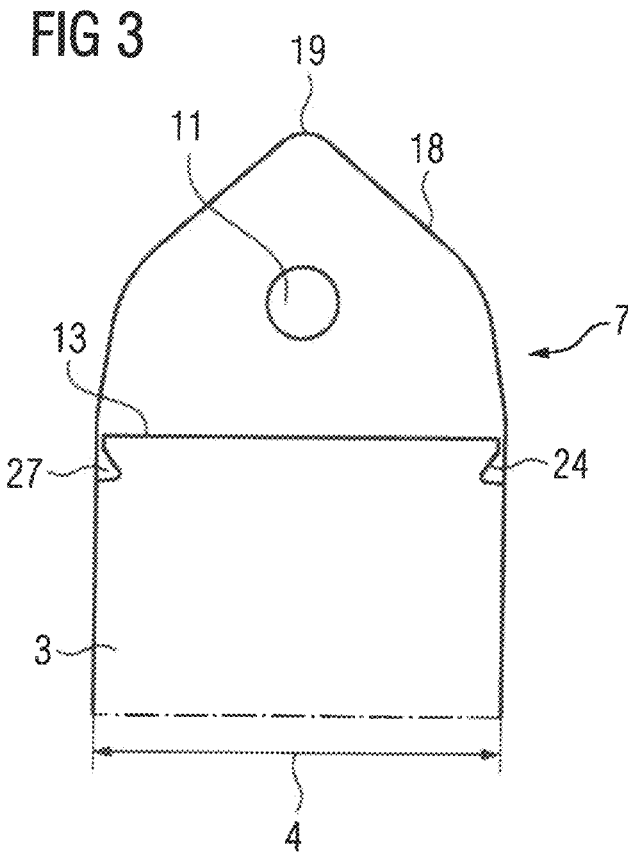
FIG. 3 shows an auxiliary element on a tooth.

FIG. 2 shows a partial laminated core 12 at an axial end of the laminated core 26, wherein the partial laminated core 12 has a pressure plate 1 with pressure fingers 2, which serve to compact the laminated core 26. Arranged on one pressure finger 2 is an auxiliary element 7, which is shown in more detail in FIG. 3.

The auxiliary element 7 has a basic triangular shape, wherein the triangle has two identical leg sides 15, which each have a kink 18 in the upper part. This kink 18 makes it easier to guide a form-wound coil or a tooth-wound coil 16 onto the tooth 3 or into the slot 6.

The auxiliary element 7 should have a good sliding capability in particular above the kink 18, in order to avoid tilting of the coil during the mounting process. The auxiliary element 7 is made from a slidable material, such as glass reinforced laminate or PTFE or some other hard plastic. It can also be made from a metal, in particular steel.

Optionally, a coating, for example a sliding film, can be provided in the upper part of the leg sides 15, this further improving the sliding capability. This coating can be replaced when it becomes worn.

Snap-fitting elements 27 can improve the temporary fixing of the auxillary elements 7 in recesses 24 of the tooth 3 (FIG. 3) or on the pressure finger 2.

The tooth width 4, in particular in the region of the tooth head 13, is the same as or slightly less (about 0 to 3 mm depending on the dimension of the arrangement) than the width 10 of the auxiliary element 7 in this region. In this way, contact of the insulation with the edges of the tooth head 13 is always avoided during mounting.

In other words, the width 10 of the auxiliary element 7 is thus the same as the tooth width 4 or slightly greater. In order to be able to improve removal after the mounting of the auxiliary element 7, an eye 11 is provided in the upper region of the auxiliary element 7.

Figure 4:
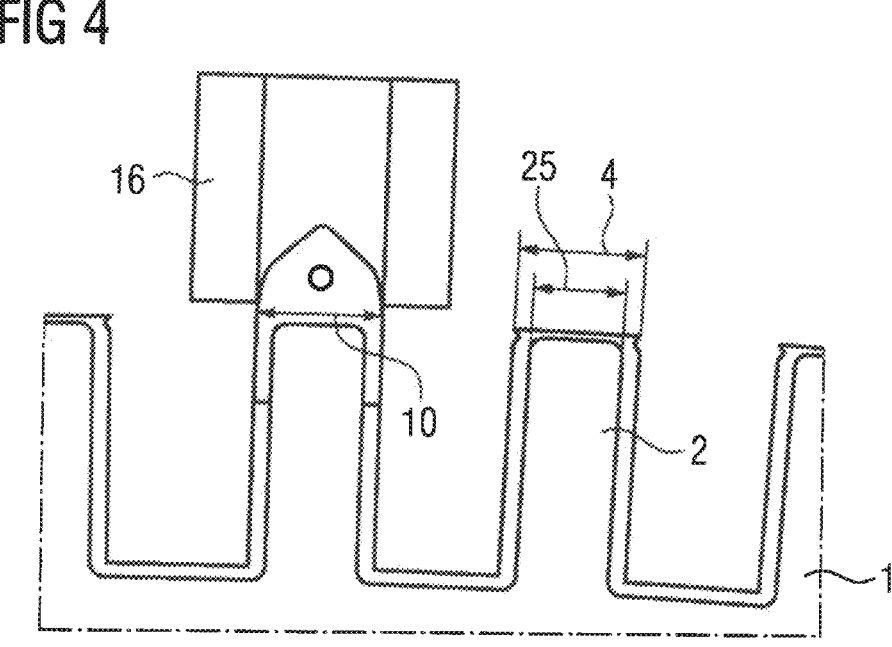
FIG. 4 shows a basic mounting operation.

FIG. 4 shows a basic mounting process, in which a tooth-wound coil 16 is placed in the slots 6. An auxiliary element 7 having a width 10 is positioned on the pressure fingers 2 and thus prevents contact of the insulation of the coil 16 with the edges of the laminated core 26 or partial laminated core 12.

Figure 5:
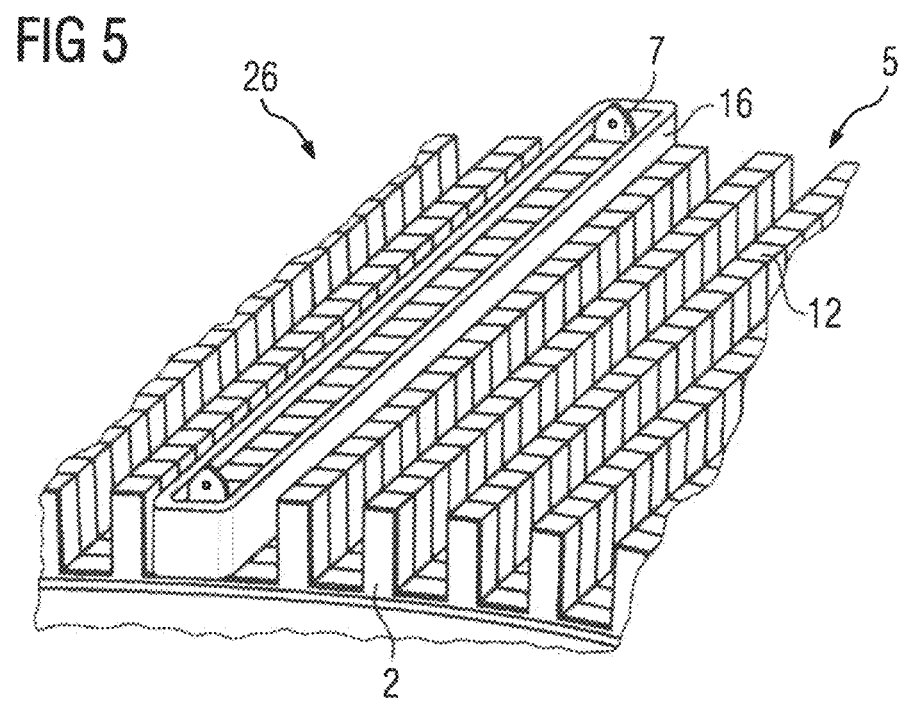
FIG. 5 shows the placement of a tooth-wound coil in slots of a laminated core.

Once the mounting of the one tooth-wound coil 16 has been completed, according to FIG. 5, the auxiliary element 7 is removed with the aid of a cutout 11, in particular an eye, and placed on the adjacent or another of the pressure fingers 2 and thus the procedure of radially introducing the coils 16 is repeated.

For each coil, at least two auxiliary elements 7 are necessary, which are each arranged on an end face of the laminated core 26 for the mounting process.

Figure 6:
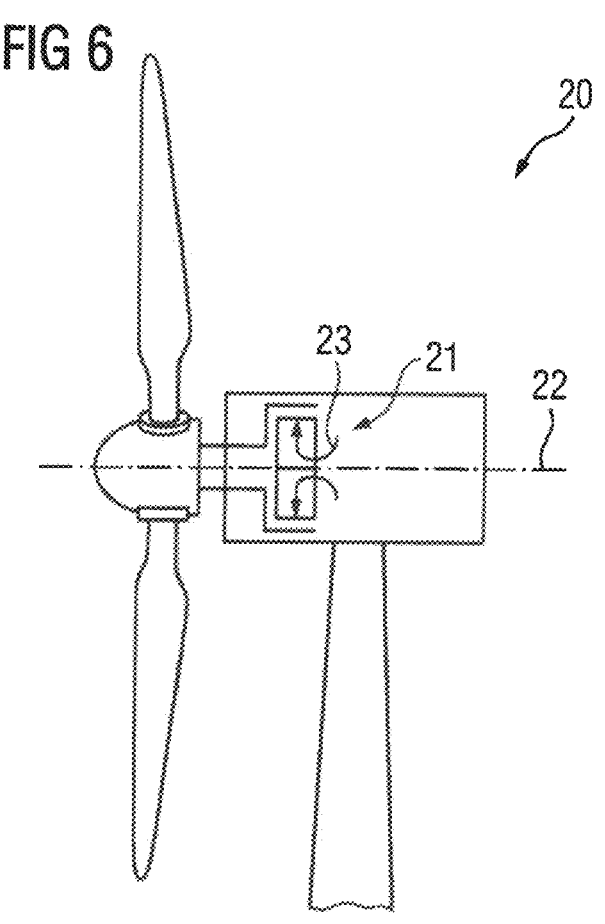
FIG. 6 shows a schematically illustrated wind turbine.

Thus, a stator or a stator segment 5 or stator segments 5 is/are now provided for a generator 21 of a wind turbine 20 according to FIG. 6 with air cooling, in which cooling air 23 is guided via gaps between the partial laminated cores 12 of the laminated core 26 in order to cool the stator.

The invention claimed is:

1. A method for mounting a prefabricated coil on a layered laminated core to form a stator segment of a stator or a stator, said method comprising:

producing a coil with insulation;

forming the layered laminated core which includes a plurality of partial laminated core sections, wherein the partial laminated core sections are spaced apart from one another by spacers and forming substantially axially extending open slots of the layered laminated core;

radially inserting the coil into the open slots such as to embrace a tooth of the layered laminated core;

placing a removable auxiliary element at an axial end face of the layered laminated core to protect the insulation of the coil is radially inserted into the open slots; and radially removing the auxiliary element and repositioning the auxiliary element on a further tooth between the open slots of the layered laminated core.

2. The method of claim 1, further comprising arranging the auxiliary element on a first one of the plurality of partial laminated core sections of the layered laminated core or a last one of the plurality of partial laminated core sections of the layered laminated core.

3. The method of claim 1, further comprising positioning the auxiliary element on a finger of a pressure plate of a partial laminated core section of the plurality of partial laminated core sections at the axial end face of the layered laminated core.

4. The method of claim 3, further comprising arranging the auxiliary element on one of the spacers between a partial laminated core section of the plurality of partial laminated core sections.

* * * * *